United States Patent
Völksen (10) Patent No.: US 11,398,945 B2
(45) Date of Patent: Jul. 26, 2022

(54) SYSTEM AND METHOD FOR FAULT DETECTION AND ROOT CAUSE ANALYSIS IN A NETWORK OF NETWORK COMPONENTS

(71) Applicant: Siemens Aktiengesellschaft, Munich (DE)

(72) Inventor: Gerd Völksen, Munich (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 17/291,914

(22) PCT Filed: Nov. 6, 2019

(86) PCT No.: PCT/EP2019/080317
§ 371 (c)(1),
(2) Date: May 6, 2021

(87) PCT Pub. No.: WO2020/094681
PCT Pub. Date: May 14, 2020

(65) Prior Publication Data
US 2022/0014426 A1    Jan. 13, 2022

(30) Foreign Application Priority Data
Nov. 7, 2018    (EP) .................................. 18204977

(51) Int. Cl.
*H04L 41/0654*    (2022.01)
*H04L 41/0604*    (2022.01)
(Continued)

(52) U.S. Cl.
CPC ........ *H04L 41/0654* (2013.01); *H04L 41/069* (2013.01); *H04L 41/0627* (2013.01); *H04L 41/0631* (2013.01)

(58) Field of Classification Search
CPC ............. H04L 41/0654; H04L 41/0627; H04L 41/0631; H04L 41/069
See application file for complete search history.

(56) References Cited

U.S. PATENT DOCUMENTS 7,072,876 B1 * 7/2006 Michael ................ G06F 21/552
706/45
8,589,436 B2 * 11/2013 Srinivasan ............... G06K 9/62
707/780

(Continued)

FOREIGN PATENT DOCUMENTS

| CN | 1529455 A | 9/2004 |
|---|---|---|
| CN | 100389567 C | 5/2008 |
| CN | 108243062 A | 7/2018 |

OTHER PUBLICATIONS

Jacobsen, et al., "The PADRES Publish/Subscribe System," https:researchgate.net/publication/220956222; 2005; 44 pages.

(Continued)

*Primary Examiner* — Philip C Lee
(74) *Attorney, Agent, or Firm* — Schmeiser, Olsen & Watts LLP (57) ABSTRACT

A system for error detection and troubleshooting analysis in a network consisting of a plurality of network components having software modules and communication interfaces and network nodes, which are connected to the network components by means of communication connections. The network components and/or the network nodes are designed to generate data, which are stored as a quantity of historical data, and to form event sequences from the quantity of historical data consisting of a sequence of events is provided. The system is designed to extract those event sequences from the event sequences which end with an alarm event (a), to extract relevant events in turn from said event sequences having an alarm event (a) for an error (Continued)

analysis and to construct reduced event sequences from the relevant events, and, for each reduced event sequence, to construct an automaton for detecting said reduced event sequence.

9 Claims, 4 Drawing Sheets

(51) Int. Cl.
*H04L 41/0631* (2022.01)
*H04L 41/069* (2022.01)

(56) References Cited

U.S. PATENT DOCUMENTS

| | | | |
|---|---|---|---|
| 2011/0040441 A1* | 2/2011 | Gaudan | G06F 11/079 701/29.5 |
| 2011/0320878 A1* | 12/2011 | Rosu | G06F 11/302 714/38.1 |
| 2012/0124353 A1 | 5/2012 | Rehman | |
| 2017/0118092 A1 | 4/2017 | Dixon et al. | |

OTHER PUBLICATIONS

International Search Report and Written Opinion in corresponding PCT Patent Application No. PCT/EP2019/080317 dated Feb. 25, 2020. 13 pages.

* cited by examiner

SYSTEM AND METHOD FOR FAULT DETECTION AND ROOT CAUSE ANALYSIS IN A NETWORK OF NETWORK COMPONENTS

CROSS-REFERENCE TO RELATED APPLICATIONS

This application claims priority to PCT Application No. PCT/EP2019/080317, having a filing date of Nov. 6, 2019, which is based off of European Patent Application No. 18204977.5, having a filing date of Nov. 7, 2018, the entire contents both of which are hereby incorporated by reference.

FIELD OF TECHNOLOGY

The following relates to a system and a method for fault detection and root cause analysis in a network of network components.

BACKGROUND

Data processing of event data and/or sensor data is used, for example, to detect critical states or faults in industrial or factory installations. The components of the installations are networked and transmit their event and sensor data to corresponding computers where the processing takes place. "Internet of Things" (IoT), "Web of Systems" (WoS), "Industry 4.0" or "Cyber-Physical Systems" (CPS) are terms which describe this topic.

The creation of modern automated installations, for example production cells in the automotive industry or in any other desired production installation, is based on the concept of cyber-physical networks (cyber-physical systems). A cyber-physical network denotes the combination of mechanical-electronic components, or else chemical elements, with software modules, which communicate with one another via a data infrastructure, for example the Internet, and is distinguished by a high degree of complexity. Cyber-physical networks are formed by networking embedded network components by means of wired or wireless communication networks. Cyber-physical networks cover a broad range of possible areas in which they can be used. These include medical devices and systems, traffic control and traffic logistics systems, networked safety and driving assistance systems in the automotive sector, industrial process control and automation installations in manufacturing, energy supply management systems, infrastructure systems for telecommunications and the like.

Large networks (network systems) of this type produce large quantities of event messages or sensor data relating to states and faults (events) of individual components or subnetworks. All of these messages must be transmitted and processed. Within the scope of this embodiment of the present invention, an event within a particular network or a domain is referred to as an event. It is something which has already occurred or is considered to be something which has occurred within a particular field of application (domain).

Faults must be detected in real time if possible in order to enable a fast response to said faults. However, fault messages often produce a plurality of subsequent faults, with the result that the actual cause of the fault can often be detected only with difficulty. Subsequent faults can also in turn entail further subsequent faults, thus resulting in avalanches of event chains. In this case, several terabytes of data may arise each day and even petabytes per hour may arise in highly complex systems.

In the case of a centrally organized and structured data processing solution, the data traffic of a very large number of signal or event data items must be enabled by means of appropriately large transmission capacities since otherwise there is a bottleneck, to be precise generally where the data converge, specifically in the computer which provides the central event and sensor data processing.

In addition, in the case of a centralistic solution, the data processing must provide sufficient storage and computing capacity in order to be able to handle and process the large volumes of data, which likewise results in a bottleneck if the volumes of data become very large. Even if the sensor and event data are processed in a cloud computing environment, the bottleneck still remains during data transmission. Cloud computing (computer cloud or data cloud) denotes the provision of an IT infrastructure, for example storage space, computing power or application software, as a service via the Internet. IT infrastructures are therefore provided via a computer network without installing them on a local computer. These services are offered and used by means of technical interfaces and protocols, for example a web browser.

However, access to a cloud infrastructure is not designed for very high transmission bandwidths, with the result that it is useful to preprocess the data in communication and industrial networks.

Previous solution approaches are geared to reducing the transport volume and the processing complexity of the data. One possibility involves decentralizing the processing of the sensor data, in which the computing requirements are distributed among different components. Possible components which can be used are network nodes, control components or other hardware units which are connected to the data network of a system, such as an industrial installation, and have sufficient free storage capacity and suitable computer powers. Each of these components is assigned rules or algorithms which process the incoming data objects (status messages, warnings, fault messages).

Another solution is the publish/subscribe approach. This is a software architecture in which the sender of information, text, messages, etc., called the publisher, does not program the messages in such a manner that they should be directly sent to specific recipients, called subscribers. Instead, the messages are divided into classes and the subscribers receive a message only when they have previously expressed an interest in the respective class to which the message has been assigned. As a result, not all data have to be transported via the communication network, but rather the data transport can be minimized in the sense of a multicast method, rather than a broadcast method. Data objects for which there is no subscription are not distributed at all.

The term "multicast" in telecommunications denotes transmission of a message from one point to a group and is therefore a form of multi-point connection. The difference from the term "broadcast" is that contents are disseminated in broadcast which can be viewed by everyone with accordingly suitable receiving equipment, whereas registration with the sender is previously required in multicast.

A further solution involves distributing the sensor data processing among so-called event processing units (EPUs) in the data network, thus eliminating the central data processing of the data objects. The EPUs are distributed among the network nodes and control components in the network. The functions (rules and algorithms) are distributed in a manner such that the distance between the data producers and the data consumers (EPUs with processing rules) is minimized. In this case, the distance is measured in an appropriate metric, for example by means of so-called hop counts or the data transport speed. In computer networks, the distance from one network node to the next is referred to as a hop. In a computer network, the binary information is divided into data packets which are forwarded from intermediate station to intermediate station until they have reached the addressees. The hop count is the number of steps which must be covered by a packet on the way from the sender to the addressee.

The EPUs can filter the data streams by means of appropriate rules or algorithms, for example according to time, value or value deviation, can form the mean value, the standard deviation and/or the median or can extract an item of higher-quality, content-richer information, a so-called event, from different signal types. Each network node can therefore appear both as a consumer and as a producer of events.

Overall, these approaches together ensure that the data traffic is reduced such that only those segments of the network in which consumers with a subscription are also located and the data can be processed more quickly are burdened with data traffic. These approaches are also used within the scope of "Distributed Complex Event Processing". Complex event processing (CEP) is an information technology topic which deals with the detection, analysis, grouping and processing of events which are dependent on one another. CEP is an umbrella term for methods, techniques and tools for processing events as they occur, that is to say continuously and promptly. CEP derives higher, valuable knowledge from events in the form of so-called complex events, that is to say situations which can be detected only as a combination of a plurality of events.

CEP therefore involves, in particular, the handling of events which occur only as a result of the interaction of a plurality of events. In order to process various data streams in real time and to extract and analyze the events, high data loads must be tolerated by such systems. Fields of use are, for example, network monitoring, public safety, disaster prevention or energy management.

US 2017/118092 A1 describes an adaptive notification and ticketing system for a telecommunications network. The system comprises a computer device and a plurality of network devices assigned to the telecommunications network. Data are generated by a multiplicity of past network events which are assigned to the multiplicity of network devices. The model is generated from the data and is used to interpret new network events and to indicate a possible alarm event.

US 2012/124353 A1 describes a method for processing event streams, wherein different processing units process event data assigned to an event stream according to previously defined criteria and method steps.

However, the problem of causal fault extraction from a flood of event data, for example fault data, subsequent fault data, warnings, status messages, etc., is still unresolved. Within the scope of the embodiment of the present invention, causal fault extraction is used to denote the removal and identification of causal and fundamental faults from streams of fault messages and data which are relevant to a system.

SUMMARY

The aspect on which the embodiment of the present invention is based is now to specify a system and a method distinguished by improved determination and analysis of the causal faults in a possible fault chain in a network of network components.

According to a first aspect, the present invention relates to a system for fault detection and root cause analysis in a network comprising a plurality of network components, which are provided with software modules and communication interfaces, and network nodes which are connected to the network components by means of communication connections, wherein the network components and/or the network nodes are designed to generate data stored as a set of historical data and to form event sequences comprising a sequence of events from this set of historical data. The system is designed to in turn extract those event sequences which end with an alarm event from the event sequences, and to in turn extract relevant events from these event sequences with an alarm event and to construct reduced event sequences comprising relevant events therefrom. The system is also designed to construct, for each reduced event sequence, an automaton for detecting this reduced event sequence, and to gradually combine the automatons constructed for each reduced sequence event to form a common automaton for all reduced event sequences.

This provides a system which is distinguished by considerably improved monitoring and analysis of causal faults in event chains (event sequences) and makes it possible to reduce storage capacities in comparison with a conventional system since an automaton for detecting reduced event sequences is formed.

According to a further configuration of the present invention, the system is designed to optimize the common automaton to form a deterministic automaton.

The system is advantageously designed to break down a state transition function of the deterministic automaton and to distribute it in the network.

In a further configuration of the present invention, the system is suitable for distributing a publish/subscribe protocol to one or more network nodes.

According to a second aspect, the present invention relates to a method for fault detection and root cause analysis in a network comprising a plurality of network components, which are provided with software modules and communication interfaces, and network nodes which are connected to the network components by means of communication connections. The network components and/or network nodes generate data stored as a set of historical data and form event sequences comprising a sequence of events from this set of historical data, comprising:
  extracting those event sequences which end with an alarm event from the event sequences,
  extracting relevant events from the event sequences with an alarm event and constructing reduced event sequences comprising the relevant events, and
  constructing, for each reduced event sequence, an automaton for detecting this reduced event sequence,
  wherein the constructed automatons are gradually combined to form a common automaton for all reduced event sequences.

According to a further configuration of the method according to the present invention, the common automaton is optimized to form a deterministic automaton.

According to one advantageous further development of the method according to the present invention, a state transition function of the deterministic automaton is broken down and is distributed in the network.

In a further configuration of the method according to the present invention, a publish/subscribe protocol is distributed to one or more network nodes.

According to a third aspect, the present invention relates to a computer program product (non-transitory computer readable storage medium having instructions, which when executed by a processor, perform actions), containing one and/or more executable computer codes for carrying out the method according to one embodiment of the method of the second aspect of the present invention. According to a fourth aspect, the present invention relates to a non-volatile computer-readable data storage medium containing executable program code which is designed to carry out the method according to one embodiment of the second aspect of the present invention when it is executed.

BRIEF DESCRIPTION

Some of the embodiments will be described in detail, with reference to the following figures, wherein like designations denote like members, wherein.

DETAILED DESCRIPTION

Figure 1:
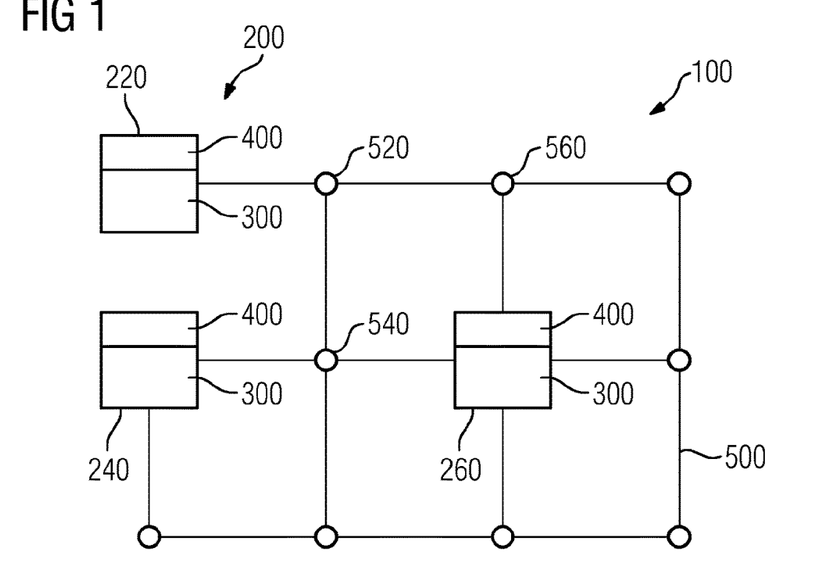
FIG. 1 depicts an overview illustration for explaining a system.

FIG. 1 shows a system 100 for fault detection and root cause analysis in a network 200 having network components 220, 240, 260, . . . , N and network nodes 520, 540, 560, . . . , M which are illustrated only by way of example here. The number N of network components 220, 240, 260 and the number M of network nodes 520, 540, 560 can be adapted to the respective application. The components 220, 240, 260 may represent sensors with software modules 300 and communication interfaces 400 or else actuators and control devices which each generate data which can be represented as event sequences, for example on the basis of the progression of time. One or more of these data packets may cause an alarm to be triggered or may indicate that an alarm indicating, for example, the faulty behavior of a network component 220, 240, 260 itself and/or of an installation and/or of a unit, which is monitored with the network components 220, 240, 260, should be triggered.

An installation or a unit may also represent a room or a building complex or an industrial installation which is respectively monitored with the components 220, 240 and 260. For example, some of the network components 220, 240, 260 may represent, for example, temperature sensors and smoke detection sensors which monitor the rooms in a building. The network components 220, 240, 260 are connected to the network nodes 520, 540 and 560 by means of communication connections 500. The network nodes 520, 540 and 560 may be routers, control devices and other hardware devices which have the required computer power. However, in one further development of the invention, the network nodes 520, 540 and 560 may also themselves generate data which they then forward to other network nodes 520, 540, 560.

The network components 220, 240 and 260 generate data for a particular event. For example, the measurement of a temperature T at a particular time $t_x$ is an event E. If a further temperature value T is now measured at a further time $t_y$, this is a further event. The events can now be combined to form event sequences. Within the scope of this invention, it is of interest to discover the events which indicate a fault of a system to be monitored and/or an installation, etc.

Figure 2:
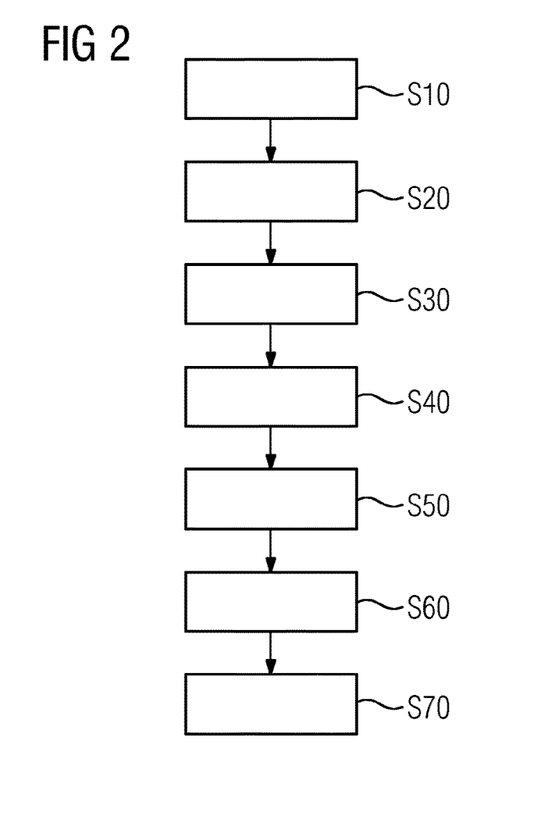
FIG. 2 depicts a flowchart for explaining a method.

FIG. 2 shows a flowchart of a method according to the invention for root cause analysis of causal faults in one or more event sequences, as occur in the network 200.

In step S10, those event sequences which end with an alarm event "a" are extracted from a set of historical data.

In step S20, the relevant events are extracted from the event sequences which end with an alarm event "a" and reduced event sequences comprising relevant events are constructed therefrom. A relevant event is an event which is assigned a significance with regard to indicating a fault and/or an alarm.

In step S30, for each reduced event sequence, a special (or: fundamental) automaton, $A_i$, 700 which detects this reduced event sequence is constructed.

In step S40, the constructed (special or fundamental) automatons, $A_i$, 700 are gradually combined to form a common automaton (from integrated fundamental automatons), $gA_i$, 800 for all reduced event sequences.

In step S50, this common automaton, $gA_i$, 800 is optimized.

In step S60, the state transition function δ of the common automaton, gAi, 800 is broken down and is distributed in the network 200.

In step S70, the publish/subscribe protocol is distributed to the network nodes n 540, 560.

Steps S10-S70 are described in detail below.

Step S10: extraction of the event sequences from the historical data

An event sequence comprises a sequence of events, wherein an event is measured and/or generated by the network components 220, 240, 260. Those event sequences which end with an alarm event "a" are extracted from the set of event sequences. An alarm event "a" indicates a critical situation, for example an increased temperature or an increased pressure. An event sequence which ends with an alarm event "a" can be described as follows:

$$e_0(t_0) \rightarrow e_1(t_1) \rightarrow e_2(t_2) \rightarrow \ldots \rightarrow e_{N-2}(t_{N-2}) \rightarrow e_{N-1}(t_{N-1}) \rightarrow e_N(t_N) = a$$

with times $t_{i-1} < t_i$ for i=1, . . . , N.

The representative set of historical data for selecting the event sequences is advantageously large enough so that it is possible to make a realistic random selection of event sequences as training data for a neural network, for example, in order to avoid an accumulation of special cases. The representative event sequences which are not selected and are not included in the root cause analysis can be used as test data, however.

The randomly selected event sequences can be determined according to the following quantitative criteria:

a) Determination of a relevant time window ΔT>0 for detecting an event, wherein this time window is in the seconds to hours range according to the respective application. Every event in this time window is taken into account:

$$\{e_i(t_i)|t_N-\Delta T \leq t_i \leq t_N\}$$

b) Determination of the relevant number K<N of events which are intended to precede an alarm. This may be a few to thousands of events according to the application. Every event after this predefined number is then taken into account:

$$\{e_i(t_i)|N-K \leq i \leq N\}$$

c) First combination of a) and b): only the last events from a time window ΔT are taken into account, that is to say a maximum of K events:

$$\{e_i(t_i)|t_N-\Delta T \leq t_i \leq t_N \text{ and } N-K \leq i \leq N\}$$

d) Second combination of a) or b): consideration of all events from the time window ΔT, but at least the last K:

$$\{e_i|t_N-\Delta T \leq t_i \leq t_N \text{ or } N-K \leq i \leq N\}$$

In addition to the time and the number, it is possible to define the following qualitative criteria which relate, for example, to the type, origin or content of the events, for example:
type of event
type of event source
origin of the event, for example divided according to the real or logical location:
geometrical data
network segment of the event source
subsystem of the installation
content of the event: a predicate which reads the value of the event and generates a Boolean value, for example:

$$e_i(t_i) \cdot \text{value} > \text{Limit}$$

or $$|e_i(t_i) \cdot \text{value} - \text{Limits}| <$$

This preselection of events for detecting patterns which result in an alarm "a" is dependent on the application and requires respective specific expert knowledge since, on the one hand, the set of events to be considered should not be too large, which may easily be the case with event sources having high-frequency data generation such as when measuring revolutions in turbines, and, on the other hand, no events which could possibly indicate an alarm should be excluded.

A simple example of generating a root cause analysis is described below.

An event sequence 1 consists of the events b→c→d→e→g→a, and an event sequence consists of the events d→c→f→g→a, which each result in an alarm "a".

The event sequences 1 and 2 are quantitatively analyzed by counting the frequency of the individual events a, b, c, d, e, f, g, e in the event sequences. This is illustrated in table 1 for the event sequences mentioned.

TABLE 1

| Event | b | c | d | e | f | g |
|---|---|---|---|---|---|---|
| Sequence 1 | 1 | 1 | 1 | 1 | | 1 |
| Sequence 2 | | 1 | 1 | | 1 | 1 |
| Number of times an event occurs | 1 | 2 | 2 | 1 | 1 | 2 |

It is assumed that an accumulation of identical events, for example on account of a lack of filtering at the event source, does not occur. If such filters are not used, an exemplary event sequence "d→c→c→c→f→g→a" could be accordingly shortened to "d→c→f→g→a" by contracting identical events. The same applies if alternating repetition of identical events occurs, for example in the event sequence d→c→d→d→c→c→d→a.

Step S20: extraction of relevant events and construction of reduced event sequences A threshold value between the minimum number and maximum number of times a particular event occurs is determined, in the range [1, 2] in this example. In this range, only those events which occur more frequently than the determined threshold value, for example 1.5, are considered. In table 1 above, these are the events c, d and g which each occur twice in the range considered. The events b, e and f are not considered any further for the root cause analysis since they each occur only once in the two event sequences, as illustrated in table 2.

TABLE 2

| Events | c | d | g |
|---|---|---|---|
| Sequence 1 | 1 | 1 | 1 |
| Sequence 2 | 1 | 1 | 1 |
| Number of events | 2 | 2 | 2 |

The threshold value should be defined in such a manner that no events relevant to the alarm are excluded, but, on the other hand, an excessively large number of irrelevant events has to be taken into account, that is to say the threshold value should be set to be neither too high nor too low.

The event sequences which have occurred are reduced by removing the events classified as irrelevant. These are the events b and b in the event sequence 1 and the event f in the event sequence 2:

The event sequence 1 is reduced from b→c→d→e→g→a to c→d→g→a.

The event sequence 2 is reduced from d→c→f→g→a to d→c→g→a.

Step S30: construction of a non-deterministic finite automaton, Ai, 700

Figure 3:
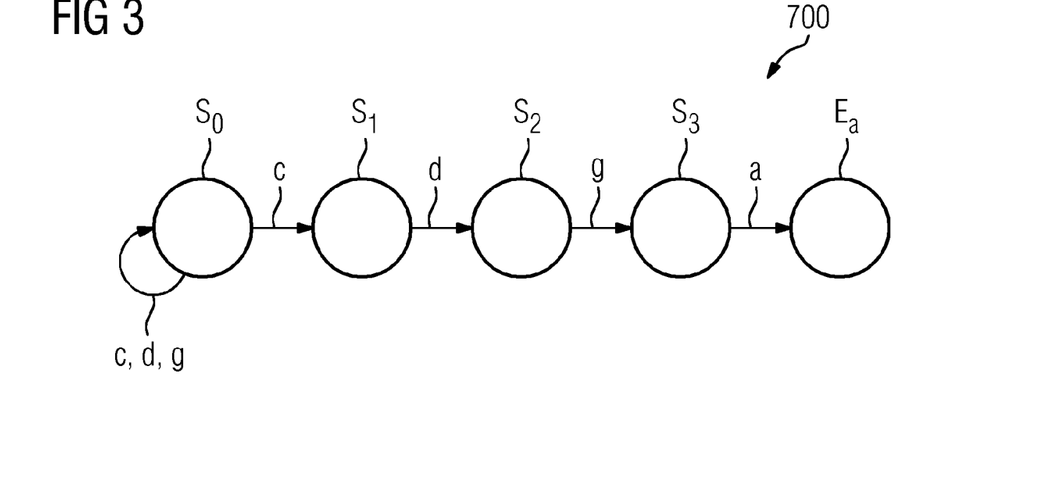
FIG. 3 depicts a block diagram for explaining a non-deterministic finite automaton for an event sequence according to an optional design detail of the method.

For each of the reduced event sequences, a non-deterministic finite automaton, $A_i$, 700 which detects these reduced event sequences is constructed. In this case, the irrelevant events (here: b, e, f) remain disregarded. FIG. 3 graphically illustrates the automaton, $A_i$, 700 for the sequence 1.

For this step S30, a non-deterministic finite automaton, $A_i$, 700 is selected. The non-determinism of the automaton, $A_i$, 700 results from the state $s_0$ since, in this state $s_0$, the event "c" can change both into the state "$s_0$" and into the state "$S_1$". A sequence of events can therefore remain in the state so until a random transition to the state "$s_1$" correctly takes place in the case of an event "c". If an event "d" now occurs, a transition to the state "$s_2$" takes place and, in the case of an event "g", the state "$s_3$" now occurs and triggers an alarm "a" which appears in the correct sequence c→d→g→a.

Only the defined transitions are illustrated for the states. The state transition function δ for the automaton Ai, 700 illustrated in FIG. 3 is illustrated in the following table 3. According to the state transition function δ, the individual states are changed to a subsequent state when a new event occurs, wherein, according to the provided non-determinism of the automaton 700, this is one subsequent state of a plurality of possible subsequent states. If appropriate, there is no subsequent state, represented by the symbol Ø for the empty set.

TABLE 3

|  | a | c | d | g |
|---|---|---|---|---|
| $s_0$ | Ø | $\{s_0, s_1\}$ | $\{s_0\}$ | $\{s_0\}$ |
| $s_1$ | Ø | Ø | $\{s_2\}$ | Ø |
| $s_2$ | Ø | Ø | Ø | $\{s_3\}$ |
| $s_3$ | $\{E_a\}$ | Ø | Ø | Ø |
| $E_a$ | Ø | Ø | Ø | Ø |

Formally, the automaton, $A_i$, 700 for a reduced event sequence is defined in the following manner: if $(v_i)$, $i=1, \ldots, N$, are the reduced event sequences with $(v)=v_0 \rightarrow v_1 \rightarrow \ldots \rightarrow v_{N-1} \rightarrow v_N = a$ and V is the set of all events which occur in the original event sequences, the finite automaton, $A_i$, 700 is defined by means of the state set S, the input set X, the state set F, the starting state so and the state transition function $\delta$ which is explained in more detail below. The automaton, Ai, 700 is therefore determined by $A_i = (S, X, F, s_0, \delta)$.

The state set s:={$E_a$} ⊎ {$s_i | i=0, \ldots, N$} is the set of all states s, that is to say, for each event $v_i$ occurring in the reduced event sequences, there is a state $s_i$ of the automaton 700. In this case, repeated occurrence of events within the event sequences is taken into account, where $v_i$ denotes the i-th occurrence of any event v therein. In particular, $s_i$ denotes that state with which the event $v_i$ changes to the state $s_{i+1}$. In a similar manner, $s_N$ denotes that state with which the event $v_N = a$ changes to the final state $E_a$.

The input set X:={a} ⊎ {$v_i | v_i \in (v_i)$, $i=0, \ldots, N-1$} represents the set for the input of the relevant events v in the event sequence, irrespective of the context in which they occur, as well as the alarm "a". The context is then represented by the state transitions.

The final state set F:={$E_a$} represents the set of final states when the alarm "a" occurs after the predefined event sequence.

The starting state $s_0 := s_0$ is the initial state.

The state transition function $\delta$: S×X→$2^S$ changes an individual state to one (or none) of a plurality of possible subsequent states when a new event occurs, where $2^S$ denotes the power set of the state set S. If the empty set Ø is indicated, there is no state transition either. The state transition function $\delta$ for any desired automatons $A_i$, 700 can be represented in a table 4 which is constructed as follows:

TABLE 4

| $\delta$ | $v_0$ | $v_i$ | $v_N = a$ |
|---|---|---|---|
|  |  | i = 1, ..., N − 1 |  |
| $s_0$ | $\{s_0, s_1\}$ | $\{s_0\}$ | Ø |
| $s_j$ j = 1, ..., N − 1 | Ø | If i = j, then $\{s_{i+1}\}$, else Ø | Ø |
| $s_N$ | Ø | Ø | $\{E_a\}$ |
| $E_a$ | Ø | Ø | Ø |

As is clear from table 4, a state $s_i$ is changed to the subsequent state "$s_{i+1}$" when an event $v_i$ occurs. An exception is the state "$s_0$" which maps all other events to itself.

In the case of the automaton, $A_i$, 700 illustrated in FIG. 3, the alarm event "a" results in the final state $E_a$. However, this can be defined differently in the practical application since it is often important for an appropriate warning to be given before a critical state is reached, that is to say before an alarm event occurs, and for the final state to have therefore already occurred in order to take suitable countermeasures.

In this respect, when processing the event sequence using the practice (field use) of the root cause analysis, a message relating to the possibly directly imminent alarm situation can be generated at the latest for the event $v_{N-1}$ (the event "g" in FIG. 3) and this message can be advantageously associated with an action which initiates a countermeasure.

Step S40: integration of the non-deterministic finite automatons, $A_i$, 700

Figure 4:
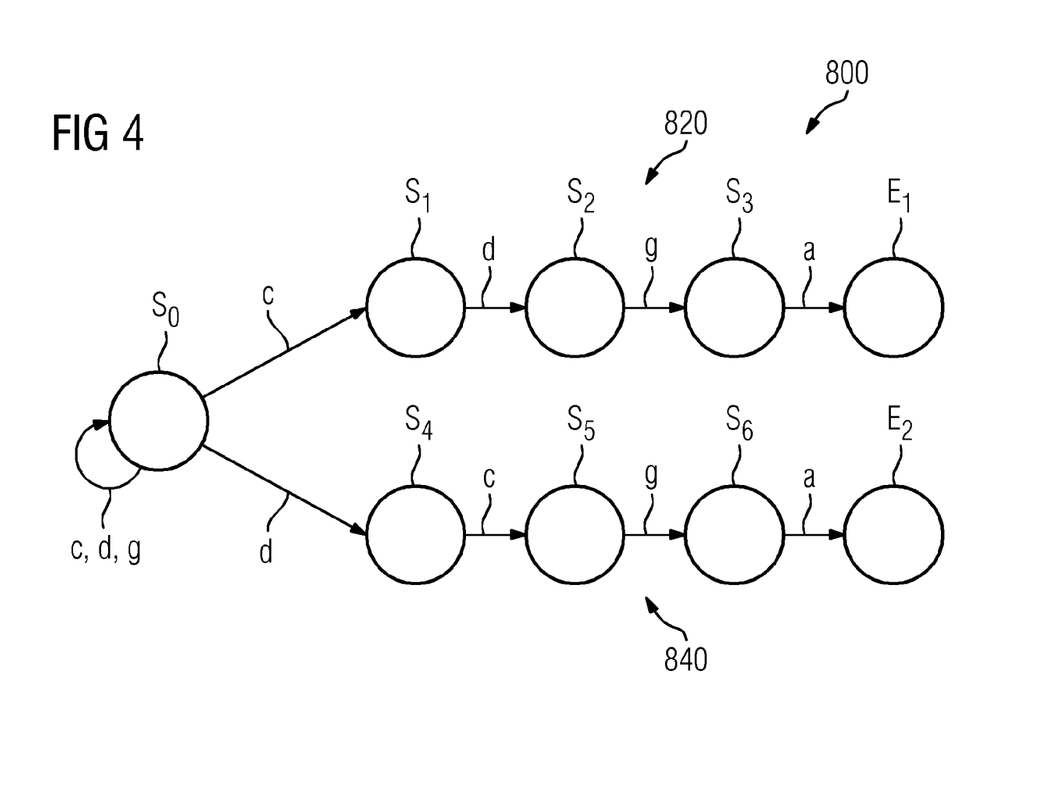
FIG. 4 depicts a block diagram for explaining a non-deterministic finite automaton for two event sequences according to an optional design detail of the method.

Since there is a set of event sequences of relevant events, a corresponding set of automatons, $A_{i1}, A_{i2}, \ldots, A_{in}$, 700 is also developed. Therefore, a common automaton, $gA_i$, 800 for detecting all event sequences is therefore constructed from these automatons $A_{i1}, A_{i2}, \ldots, A_{in}$, 700. For this purpose, the starting states are combined in a common starting state which branches off in a non-deterministic manner into the different branches 820, 840 of the various event sequences.

If $A_i = (X_i, S_i, F_i, s_{oi}, \delta_i)$, $i \in \{1,2\}$ are two $A_i$, the common $gA_i = (X, S, F, s_0, \delta)$ is defined as follows:

The input set X:=$X_1 \cup X_2$ is the simple union of the relevant events.

The state set S:={$s_o$} ⊎ ($S_1 \setminus \{s_{o1}\}$) ⊎ ($S_2 \setminus \{s_{o2}\}$) is the disjoint union of the state sets without the individual starting states, but with a new common starting state so for this purpose.

The final state set F:=$F_1$ ⊎ $F_2$ is the disjoint union of the final state sets, that is to say $$F := \{E_{a1}, E_{a2}\}$$

$$S_0 := s_0$$

The state transition function $\delta$: S×X→$2^S$ implements the following state transitions:

i) $\delta(s_o, x) := \{s_o\} \cup (\delta_1(s_{o1}, x) \setminus \{s_{o1}\}) \cup (\delta_2(s_{o2}, x) \setminus \{s_{o2}\}), \forall x \in X$;

For each event, the starting state is mapped to itself and to the subsequent states.

ii) $\delta(s, x) := \delta_1(s, x)$ if $s \in S_1 \setminus \{s_{o1}\}$ $\delta(s, x) := \delta_2(s, x)$ if $s \in S_2 \setminus \{s_{o2}\}$ FIG. 4 shows the result of this construction of a common automaton $gA_i$, 800 for the two event sequences c→d→g and d→c→g→a from the example illustrated above.

Step S50: optimization of the common automaton, $gA_i$, 800 by constructing a minimal deterministic finite automaton, $dA_i$, 900

Figure 5:
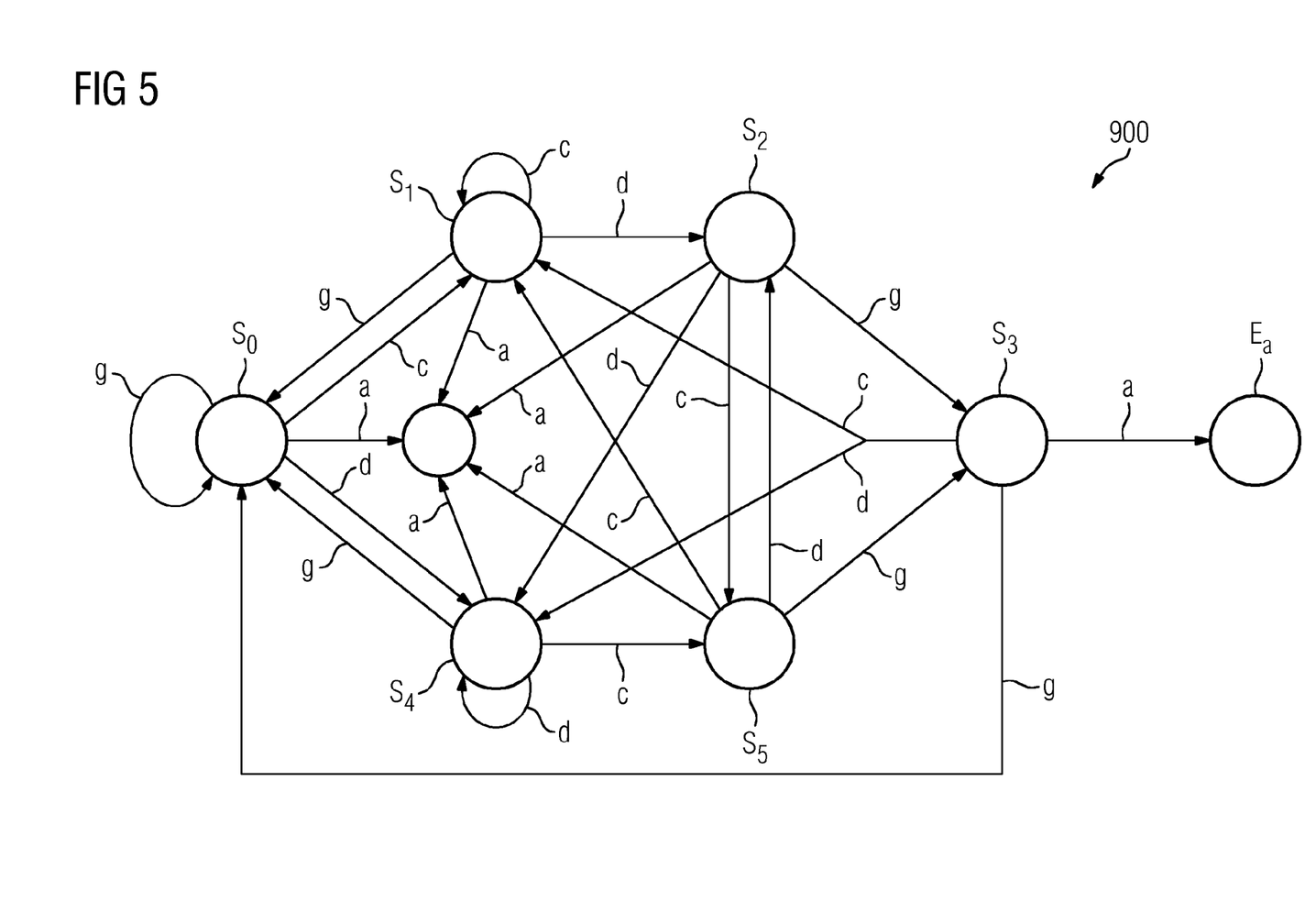
FIG. 5 depicts a block diagram for explaining a deterministic finite automaton according to an optional design detail of the method.

An equivalent deterministic minimal finite automaton, $dA_i = (S, X, F, s_0, \delta)$, 900 is constructed for the automaton, $gA_i$, 800 above. The non-determinisms occurring in the automaton, $gA_i$, 900 can be constructionally removed using standard methods, for example the power set construction. Table 5 below shows the state transition function $\delta$ for the integrated minimal deterministic automaton, dAi, 900 for the two exemplary sequences:

TABLE 5

| $\delta$ | a | c | d | g |
|---|---|---|---|---|
| $s_0$ | f | $s_1$ | $s_4$ | $s_0$ |
| $s_1$ | f | $s_1$ | $s_2$ | $s_0$ |
| $s_2$ | f | $s_5$ | $s_4$ | $s_3$ |
| $s_4$ | f | $s_5$ | $s_4$ | $s_0$ |

TABLE 5-continued

| δ | a | c | d | g |
|---|---|---|---|---|
| $s_5$ | f | $s_1$ | $s_2$ | $s_3$ |
| $s_3$ | $E_a$ | $s_1$ | $s_4$ | $s_0$ |
| $E_a$ | f | f | f | f |
| f | f | f | f | f |

The state "f" represents the empty set in the non-deterministic case. It is reached when the alarm "a" is detected without one of the predefined event sequences having previously been run through. Therefore, "f" is an indicator that the selection of event sequences was not optimal or that there is another event sequence which ends with an alarm. For the two states "f" and "Ea", "f" can be defined as a subsequent state since they are final or fault states. FIG. 5 illustrates a deterministic automaton, $dA_i$, 900 which is distinguished by a higher degree of complexity than the non-deterministic variant.

Step S60: breakdown and distribution of the state transition function of the minimal deterministic finite automaton, $dA_i$, 900

The function of the automaton, $dA_i$, 900 is described substantially by the state transition function $\delta: S \times X \rightarrow S$. The state transition function implements the root cause analysis by virtue of all events changing to subsequent states according to the state transition function $\delta$ and emitting a message when "$E_a$" or "f" occurs.

In the case of a centralistic data processing system, the state transition function $\delta$ is stored in a network node 520 in the network 200 and all events are routed to this node 520. The states then assume their respective state according to the state transition function $\delta$ until the final or fault state is reached.

In the network 200, the network nodes 520, 540, 560 which are densest at an event source, such as a network component 220, are identified. Therefore, $n_x$ is the network node 520 in which the event x is generated or which has the shortest path to a network component data source (sensor data source) 220 from x.

If additionally $\delta: S \times X \rightarrow S$ is the state transition function of the automaton $dA_i$, $\delta$ is broken down after X, thus resulting in a new function: $\delta': X \rightarrow [S \rightarrow S]$, that is to say each event $x \in X$ is assigned a state transition function $\delta'_x \equiv \delta'(x): S \rightarrow S$, $\forall x \in X$, with $\delta'(x)(s) = \delta(s, x)$.

According to the example illustrated above, the function $\delta'_c$ has the following appearance illustrated in table 6:

TABLE 6

| S | $\delta'_c(s)$ |
|---|---|
| $s_0$ | $s_1$ |
| $s_1$ | $s_1$ |
| $s_4$ | $s_5$ |
| $s_2$ | $s_5$ |
| $s_5$ | $s_1$ |
| $s_3$ | $s_1$ |
| $E_a$ | f |
| f | f |

Figure 6:
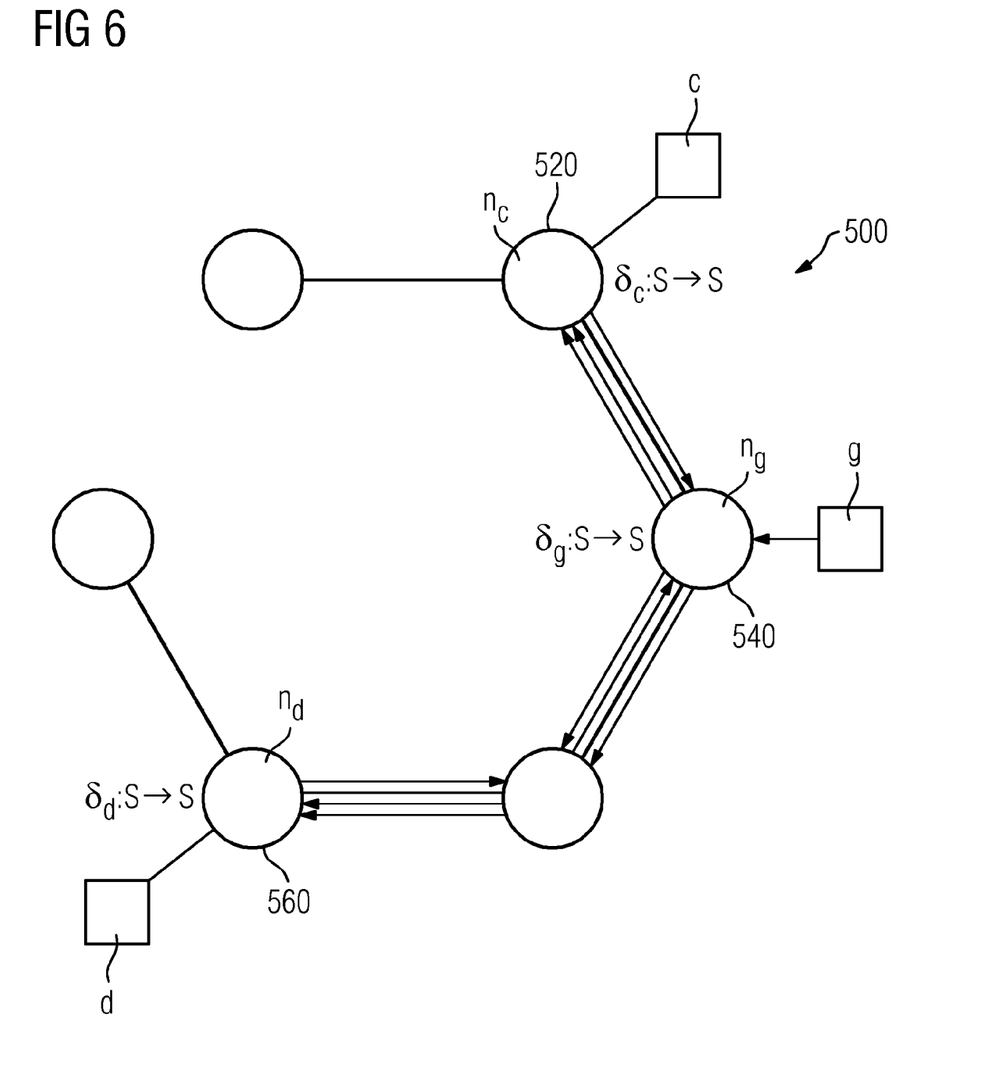
FIG. 6 depicts a block diagram for explaining an arrangement of a state transition function in a communication network according to an optional design detail of the method.

The functions $\delta'_x$ are then assigned to the respective network node, $n_x$, 520. FIG. 6 shows the assignment for an exemplary network 200 which distributes the state changes which occur among the relevant network nodes 520, 540, 560 by means of multicast messages.

The $\delta'_x$ functions can be placed manually in the network 200 if the network 200 has a certain stability, with the result that the events x always come from the same sensor data source 220.

In principle, however, not just in the case of instabilities in the network 200, the $\delta'_x$ functions can be automatically assigned using the publish/subscribe protocol.

An example of this is the PADRES publish/subscribe system which is described, for example, in: https://www.researchgate.net/publication/220956222_The_PADRES_Distributed_Publish Subscribe System.

Step S70: functions of the network nodes 520

The basic idea is that the states are likewise defined as special events and are distributed by multicast to the subscribers by means of the publish/subscribe protocol. The functions $\delta_x$, $x \in X$ in the nodes, $n_x$, 520, 540, 560 comprise a starting sequence for initializing the nodes, $n_x$, 520, 540, 560 and the protocol which is in the form of an event loop and processes both the occurrence of state events and the occurrence of network events.

The publish/subscribe protocol comprises the following three messages:

a) Advertise (s,n): the network node, n, 520 advertises the state s to all other network nodes, n, 540, 560 in a broadcast message. This advertising message is the only broadcast message in this protocol.

b) Subscribe (n,s,m): the network node, n, 540, 560, where n E N, informs the node, m, 520 that it is subscribing to the state s of it. This should be preceded by an advertising message (n,s). The subscribe message is a point-to-point message from one network node n to another network node m.

c) Publish (s,N): all nodes, n∈N, 520, 540, 560 are informed of the new state s by means of a multicast message. The nodes, n∈N, 540, 560 should have previously subscribed to the state s. Before sending a publication message, a state transition should have taken place locally.

The starting method for the node, n, 520 may comprise the following steps:

Step 1: the set of subscribers to a state change of the node $n_x$ is initially the empty set: Abos:=∅

Step 2: for all s∈$\delta_x$(S), the broadcast message "advertisement of (s,$n_x$)" is transmitted.

The state change function $\delta_x$(S) is the set of subsequent steps locally produced by $\delta_x$, that is to say the image set of $\delta_x$. These states are advertised to all other nodes, n, 540, 560.

Step 3: for all incoming messages from network nodes n at the network node $n_x$, 520, "subscribe (n,s,$n_x$)": if S∈$\delta_x$(S), the set of subscribers z changes: Abos:= Abos∪{n}

The network node $n_x$, 520 stores the nodes, n, 540, 560 which subscribe to the states advertised by the network node $n_x$.

Step 4: the network nodes n, 540, 560, in which the message "advertise (s,n)" is received, transmit the message "subscribe to ($n_x$,s,n)" to the network node $n_x$. These network nodes n therefore subscribe to the offered state event s.

Step 5: the local state variable z of the network nodes n assumes the advertised starting state $s_0$.

The individual message inputs or outputs are possibly carried out repeatedly depending on the temporal sequence in which the network nodes n, 520, 540, 560 run through the starting method.

An event loop of the node, n, 520 is as follows:

Step 1: if a message "publish (s,$n_x$)" is received in the network node $n_x$, the local state variable z of the network node $n_x$ is set to s: z:=s Step 2: if an event x is received in the network node, $n_x$, 520 and $z \neq \delta x\,(z)$, the event x initiates a new state: $z := \delta x\,(z)$;

The new state z is locally stored in the network node, $n_x$, 520. The network node, $n_x$, 520 then transmits a multicast message to all subscribers: "publish (z, Abos)". The new state z is therefore forwarded to all subscribers (Abos).

The loop can therefore be described as follows:

Loop

If message "publish (s, $n_x$)" is received: $z := s$;

If event x is received and $z \neq \delta x\,(z)$: transmit multicast message "publish (z, Abos)";

End loop

Incoming publication messages are processed with a new state in the loop by virtue of the published state being adopted into the local state variable z. Otherwise, a state change can occur if an event is read. The new state z is forwarded to the other network nodes n 540, 560, which have subscribed to the state changes, by means of a multicast message. If the event does not result in any state changes, a multicast message does not take place either.

The present invention therefore makes it possible to carry out a root cause analysis of possible causal faults in event chains (event sequences) for a network 200 comprising network components 220, 240, 260 and network nodes 520, 540, 560. A deterministic automaton, $dA_i$, 900 is constructed from reduced event sequences and a state transition function δ of the automaton, $dA_i$, 900 is distributed in the network 200. During operation of the automaton, $dA_i$, 900, states and events are equally defined as messages and are distributed in the network 200 by means of the publish/subscribe protocol. Messages relating to fault messages can therefore be forwarded in the network 200 in a targeted manner and overloading of the network 200 with a flood of data of no relevance can be avoided.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

What is claimed:

1. A system for fault detection and root cause analysis in a network comprising a plurality of network components with software modules and communication interfaces and network nodes which are connected to the plurality of network components by means of communication connections, wherein the plurality of network components and/or the network nodes are designed to generate data stored as a set of historical data and to form a plurality of event sequences each comprising a sequence of events from the set of historical data, wherein the system is designed:

to in turn extract event sequences which end with an alarm event from the plurality of event sequences;

to in turn extract relevant events based on a fault analysis from the event sequences with an alarm event and to construct reduced event sequences from the relevant events; and to construct, for each of the reduced event sequences, an automaton for detecting each reduced event sequence, wherein the system is designed to combine the automaton constructed for the each of the reduced event sequences to form a common automaton for all of the reduced event sequences.

2. The system as claimed in claim 1, wherein the system is designed to optimize the common automaton to form a deterministic automaton.

3. The system as claimed in claim 2, wherein the system is designed to break down a state transition function of the deterministic automaton and to distribute the state transition function in the network.

4. The system as claimed in claim 3, wherein the system is suitable for distributing a publish/subscribe protocol to one or more of the network nodes.

5. A method for fault detection and root cause analysis in a network comprising a plurality of network components with software modules and communication interfaces and network nodes which are connected to the network components by means of communication connections, wherein the network components and/or the network nodes generate data stored as a set of historical data and form general event sequences comprising a sequence of events from the set of historical data, comprising:

extracting event sequences which end with an alarm event from the general event sequences;

extracting relevant events for a fault analysis from the event sequences which end with an alarm event and constructing reduced event sequences comprising the relevant events; and constructing, for each of the reduced event sequences, an automaton for detecting a reduced event sequence;

wherein the automation is combined to form a common automaton for all of the reduced event sequences.

6. The method as claimed in claim 5, wherein the common automaton is optimized to form a deterministic automaton.

7. The method as claimed in claim 6, wherein a state transition function of the deterministic automaton is broken down and is distributed in the network.

8. The method as claimed in claim 7, wherein a publish/subscribe protocol is distributed to one or more of the network nodes.

9. A computer program product comprising a computer readable hardware storage device having computer readable program code stored therein, said program code executable by a processor of a computer system to implement the method as claimed in claim 5.

\* \* \* \* \*